United States Patent
Takagi

(10) Patent No.: US 7,743,120 B2
(45) Date of Patent: Jun. 22, 2010

(54) INFORMATION PROCESSING METHOD AND INFORMATION PROCESSING APPARATUS

(75) Inventor: Yoshihiro Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 876 days.

(21) Appl. No.: 10/530,490

(22) PCT Filed: Oct. 22, 2003

(86) PCT No.: PCT/JP03/13482

§ 371 (c)(1),
(2), (4) Date: Apr. 6, 2005

(87) PCT Pub. No.: WO2004/040443

PCT Pub. Date: May 13, 2004

(65) Prior Publication Data

US 2006/0122848 A1  Jun. 8, 2006

(30) Foreign Application Priority Data

Oct. 29, 2002 (JP) .............................. 2002-314927
Nov. 8, 2002 (JP) .............................. 2002-325759
Sep. 4, 2003 (JP) .............................. 2003-313081

(51) Int. Cl.
G06F 15/177 (2006.01)
(52) U.S. Cl. ..................................................... 709/221
(58) Field of Classification Search .................. 709/223
See application file for complete search history.

(56) References Cited

U.S. PATENT DOCUMENTS

| 6,473,854 | B1* | 10/2002 | Fleming, III | 713/1 |
| 6,814,510 | B1* | 11/2004 | Sabbagh et al. | 400/63 |
| 2002/0083131 | A1 | 6/2002 | Machida | 709/203 |
| 2002/0083431 | A1* | 6/2002 | Machida | 717/174 |
| 2002/0156947 | A1 | 10/2002 | Nishio | 710/36 |
| 2002/0184304 | A1* | 12/2002 | Meade et al. | 709/203 |
| 2004/0249919 | A1* | 12/2004 | Mattheis | 709/223 |
| 2005/0038927 | A1 | 2/2005 | Choi et al. | 710/8 |

(Continued)

FOREIGN PATENT DOCUMENTS

EP 2 365 662 A 2/2002

(Continued)

OTHER PUBLICATIONS

May 23, 2007 Notice of Allowance in Korean Patent Application.

(Continued)

Primary Examiner—Vivek Srivastava
Assistant Examiner—Xiang Yu
(74) Attorney, Agent, or Firm—Fitzpatrick, Cella, Harper & Scinto

(57) ABSTRACT

As a preferred embodiment, an information processing method of distributing across a network a control program for controlling a network device to a client apparatus for managing the network device, comprising, a designation step of designating range information for searching for a network device connected to the network, and a search step of searching for the network device corresponding to the designated range information on the basis of the designated range information and a distribution step of distributing a control program to the client apparatus for managing the network device within the range searched by the processing in the search step is disclosed.

7 Claims, 15 Drawing Sheets

U.S. PATENT DOCUMENTS

2005/0066324 A1    3/2005    Delgado et al.    ............ 717/170

FOREIGN PATENT DOCUMENTS

| | | |
|---|---|---|
| JP | 10-254708 | 9/1998 |
| JP | 2000-215128 | 8/2000 |
| JP | 2000-250393 | 9/2000 |
| JP | 2001-320767 | 11/2001 |
| JP | 2002-7255 | 1/2002 |
| JP | 2002-99816 | 4/2002 |
| JP | 2002-135844 | 5/2002 |
| JP | 2002-251347 | 9/2002 |
| KR | 2002-0036969 A | 5/2002 |
| KR | 10-2005-0015925 | 2/2005 |
| KR | 10-2005-0029705 | 3/2005 |
| KR | 10-0478857 B1 | 3/2005 |
| WO | 2004/040443 | 5/2004 |

OTHER PUBLICATIONS

Aug. 29, 2007 Supplementary European Search Report in European Patent Application No. 03 75 8773.

Sep. 4, 2006 Final Rejection in Japanese Patent Appln. No. 2003-313081 (with English Translation).

* cited by examiner

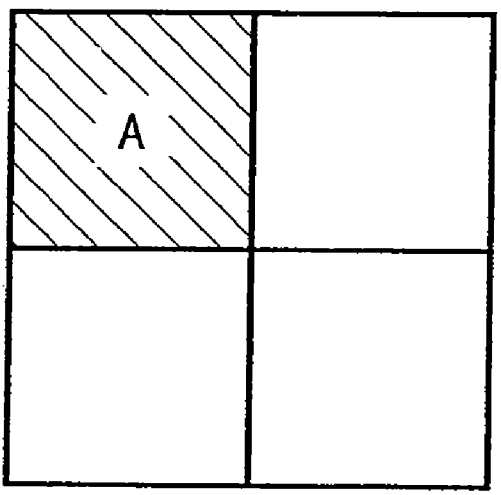 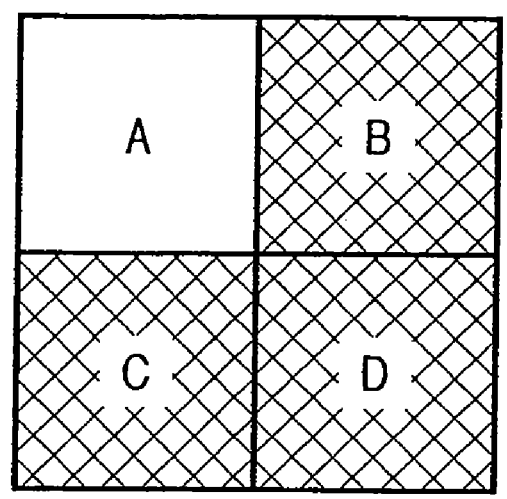
F I G. 12A   F I G. 12B

FIG. 14

```
var cp = new ActiveXObject("CNClientPC");          ~S1401
var cpo = cp.TargetClients("GROUP-1");             ~S1402
var cpe = new Enumerator(cpo.Lists);               ~S1403 var np = new ActiveXObject("CNNetworkPrinter");    ~S1404
var npo = np.TargetPrinters("WITHIN", "192.168.0.1", "192.168.0.15");  ~S1405
var npe = new Enumerator(npo.Lists);               ~S1406 for ( ; !cpe.atEnd() ; cpe.moveNext()) {           ~S1407
    for ( ; !npe.atEnd() ; npe.moveNext()) {       ~S1408
        AddPrinterDriver(cpe.item(), npe.item());  ~S1409
        AddPrinter(cpe.item(), npe.item());        ~S1410
    }                                              ~S1411
}                                                  ~S1412
```

FIG. 15

```
var cp = new ActiveXObject("CNClientPC");          ~S1501
var cpo = cp.TargetClients("GROUP-1");             ~S1502
var cpe = new Enumerator(cpo.Lists);               ~S1503 var np = new ActiveXObject("CNNetworkPrinter");    ~S1504
var npo = np.TargetPrinters("WITHOUT", "192.168.0.1", "192.168.0.15");  ~S1505
var npe = new Enumerator(npo.Lists);               ~S1506 for ( ; !cpe.atEnd() ; cpe.moveNext()) {           ~S1507
    for ( ; !npe.atEnd() ; npe.moveNext()) {       ~S1508
        AddPrinterDriver(cpe.item(), npe.item());  ~S1509
        AddPrinter(cpe.item(), npe.item());        ~S1510
    }   ~S1511
}   ~S1512
```

INFORMATION PROCESSING METHOD AND INFORMATION PROCESSING APPARATUS

TECHNICAL FIELD

The present invention relates to a technique which installs or updates in client computers on a network control programs for controlling network devices connected to the network.

BACKGROUND ART

One conventional printer driver installation method is to input predetermined items in an interactive manner in accordance with the OS of each client computer for controlling a printer. When "Windows" of Microsoft is used by this method, for example, a user selects "add printer" from "properties" of printer and inputs necessary information by an interactive program called wizard, thereby installing a printer driver.

Another method installs a printer driver by user's operation using an installer in the same manner as addition of an application. Also, when printing is to be performed by controlling a specific client apparatus (Point & Print), a printer driver can be installed in the client apparatus from a print server by distribution by using, e.g., Windows NT/2000.

In the conventional techniques as described above, the printer driver installation operation must be performed for each individual client apparatus. If, for example, printing is to be executed by printers by controlling various client apparatuses across a network in a company having a large number of computers, printer drivers must be installed in all the client apparatuses. The total number of manual steps of the operation cannot be ignored. Furthermore, to normally install a printer driver in each client apparatus, a certain procedure must be reliably followed. Therefore, the operator must have knowledge and capability to some extent or more.

This requires preparations relevant to installation, e.g., it is necessary to form a detailed manual for executing installation, and educate all the clients. In addition, if installation cannot be normally performed, a network manager must install a printer driver in each of all the client apparatuses. This enormous work interferes with the company activities requiring rapid and efficient operations.

Also, in the Point & Print method using a printer server, printer drivers can be installed in all client apparatuses to which automatic printer driver distribution is designated. However, since the printer drivers are installed in all the client apparatuses by automatic distribution, a network manager may become unable to manage the use of a printer.

As a method of solving these problems, a method called "push type printer driver installation" is known. In this method, if client apparatuses require installation or update of printer drivers, this installation or update is not performed on the client apparatuses. Instead, the method allows a network manager on the server side to install or update the printer drivers in all the client apparatuses. In this push type printer driver installation, even if a client apparatus is performing a certain operation or printing data, a printer driver can be installed or updated without any interference with these operations. An operator on the client side need not have any knowledge concerning installation, and the network manager need not go to each client apparatus to install the printer driver. That is, the installation operation can be executed by a few operation steps.

An example of the above prior art is disclosed in patent reference (Japanese Patent Laid-Open No. 2002-251347).

The push type printer driver installation method is advantageous in that client apparatuses can be managed collectively. However, even when this method is used, a network manager must explicitly select client apparatuses in which printer drivers are to be installed. If the number of client apparatuses as objects of installation is large, selecting these client apparatuses requires a considerable time.

DISCLOSURE OF INVENTION

The feature of the present invention is to provide a technique by which a network manager does not individually select client apparatuses as objects of printer driver installation, but limits the range of printers on a network, and installs or updates printer drivers in client apparatuses which manage printers applied to this limited range. As a consequence, the network manager need not individually recognize the clients, so the operation can be performed by a minimum number of steps.

An information processing method according to the present invention by which control programs for controlling network devices are distributed across a network to client apparatuses which manage the network devices is characterized by having the following steps.

According to the present invention, provided is an information processing method of distributing across a network a control program for controlling a network device to a client apparatus for managing the network device, comprising:

a designation step of designating range information for searching for a network device connected to the network;

a search step of searching for the network device corresponding to the designated range information on the basis of the designated range information; and a distribution step of distributing a control program to the client apparatus for managing the network device within the range searched by the processing in the search step.

According to the present invention, provided is an information processing method of distributing across a network a control program for controlling a network device to a client apparatus for managing the network device, comprising:

a designation step of designating geographical range information for searching for a network device connected to the network;

a search step of searching for the network device corresponding to the designated geographical range information on the basis of the designated geographical range information; and a distribution step of distributing a control program to a client apparatus for managing the network device within a geographical range searched by the processing in the search step.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 12A and 12B are views for conceptually explaining a target region set from a designated geographical range and a printer search result to automatically update printer drivers;

FIG. 14 is a view showing an example of script information for automatically searching for a printer, and installing or updating a printer driver in the found printer; and FIG. 15 is a view showing an example of script information for automatically searching for a printer, and installing or updating a printer driver in the found printer.

BEST MODE FOR CARRYING OUT THE INVENTION

Preferred embodiments of the present invention will now be described in detail in accordance with the accompanying drawings.

The present invention has the following effect. That is, when control programs of network devices are to be installed, each of a number of existing client computers need not be recognized, and it is only necessary to designate the range of network devices as objects of installation or update. In this manner, the network addresses of the network devices within the range are acquired, and, on the basis of this address information, the control programs can be collectively installed or updated in clients which manage the network devices. This processing reduces the load required to individually install or update the printer drivers.

Alternatively, a whole installation process from automatic printer search to automatic installation can be executed only by describing simple script information for push install.

First Embodiment

Figure 1:
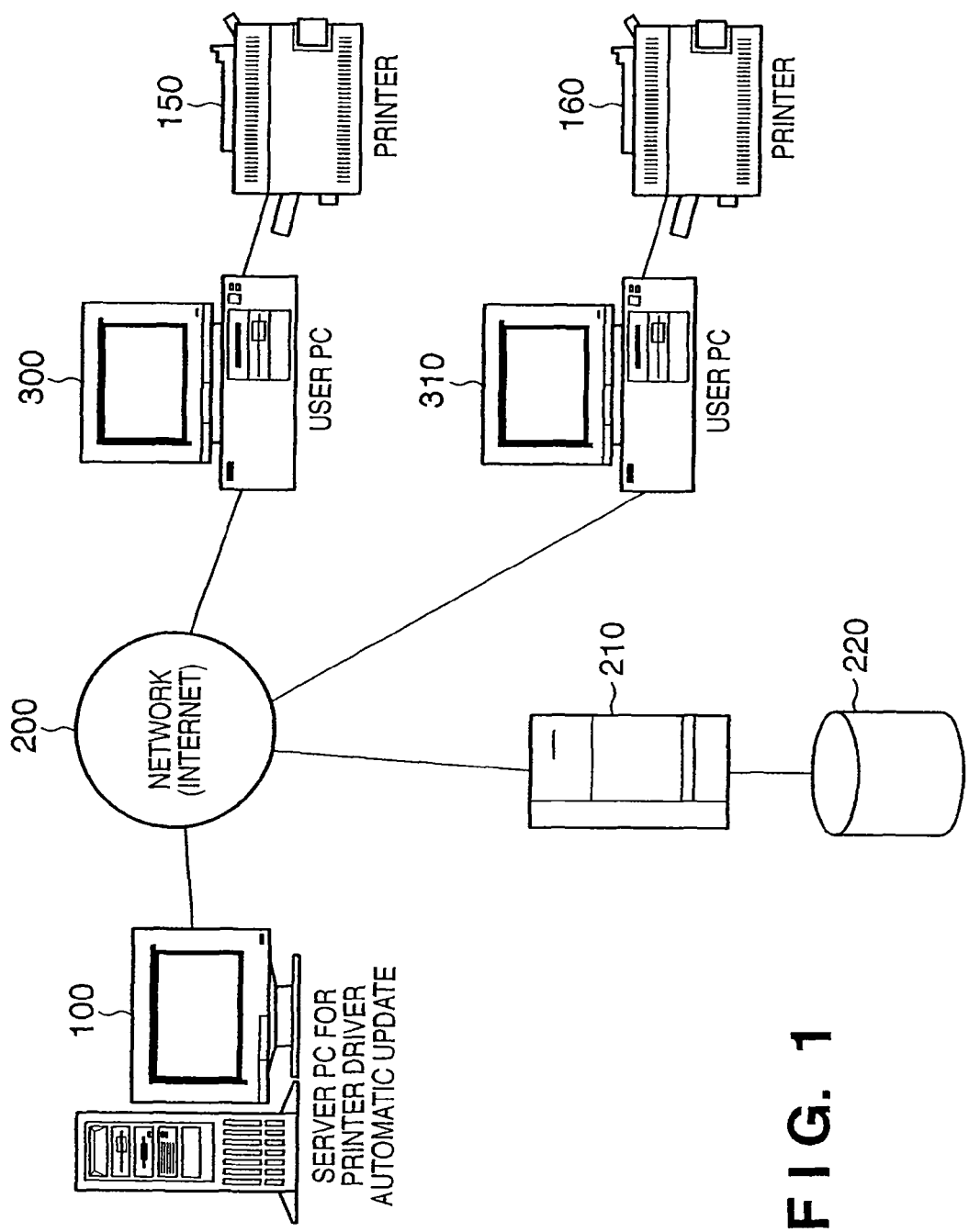
FIG. 1 is a block diagram for explaining the configuration of a system according to an embodiment of the present invention.

The first embodiment to which the present invention is preferably applied will be described below. FIG. 1 is a block diagram for explaining the arrangement of a system according to the embodiment of the present invention. User PCs 300 and 310 as client apparatuses for controlling printing of printers are connected to a network (Internet) 200, and can exchange various data with an information processing apparatus 100 (to be referred to as an automatic printer driver update server PC (server PC) hereinafter) of a printer maker. Also, the user PCs 300 and 310 are connected to printers 150 and 160, respectively, and can control the printers 150 and 160 on the basis of information distributed from the server PC 100. A file server 210 is connected to the network 200 and manages access to data stored in a network disk 220.

Figure 2:
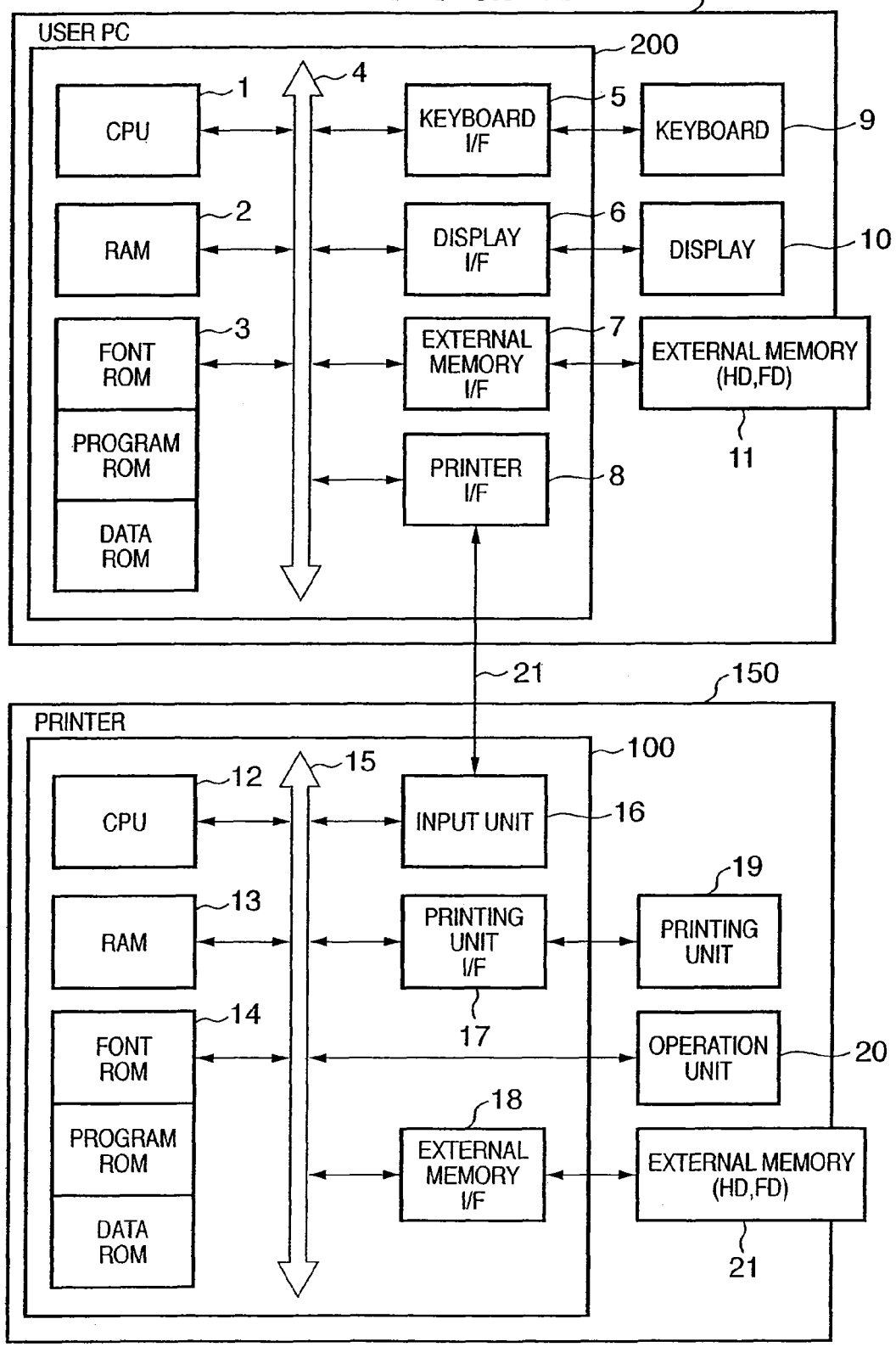
FIG. 2 is a view for explaining an outline of the internal arrangements of a user PC and printer by taking the connection of a user PC 300 and printer 150 according to the first embodiment as an example.

FIG. 2 is a view for explaining an outline of the internal arrangements of a user PC and printer by taking the connection of the user PC 300 and printer 150 as an example. Referring to FIG. 2, the user PC 300 includes a CPU 1 for processing a document containing, e.g., graphics, images, characters, and tables (including spreadsheets and the like) on the basis of a processing program or the like stored in a program ROM of a ROM 3 or an external memory 11. The CPU 1 comprehensively controls devices connected to a system bus 4. The program ROM of the ROM 3 or the external memory 11 also stores, e.g., an operating system program (to be referred to as an OS hereinafter) which is a control program of the CPU 1. A font ROM of the ROM 3 or the external memory 11 stores, e.g., font data used in the document processing described above. A data ROM of the ROM 3 or the external memory 11 stores various data used when the above-mentioned processing and the like are performed. A RAM 2 functions as, e.g., a main memory and work area of the CPU 1.

A keyboard I/F 5 controls key inputs from a keyboard 9 and a pointing device (not shown). A display I/F 6 controls the display contents of a display 10. Although not shown, the user PC 300 also includes a scanner I/F for controlling a scanner, a digital camera I/F for controlling a digital camera, a facsimile I/F for controlling a facsimile apparatus, a mouse I/F for controlling a mouse, a speaker I/F for controlling a loudspeaker, a sound source device I/F for controlling a sound source device, and a telephone I/F for controlling a communication device such as a telephone.

An external memory I/F 7 controls access to the external memory 11 such as a hard disk (HD) or floppy disk (FD) which stores a boot program, various applications, font data, user files, edit files, printer drivers, and the like. A printer I/F 8 connects the user PC 300 and printer 150 via a predetermined bidirectional interface (interface) 21, and controls communication with the printer 150.

Note that the CPU 1 makes WYSIWYG on the display 10 possible by rasterizing an outline font in a display information RAM on the RAM 2. Also, on the basis of commands designated by a mouse cursor or the like (not shown) on the display 10, the CPU 1 opens various registered windows and executes various data processing. To execute printing, a user opens a window concerning settings of printing, sets a printer, and sets a printing method, including selection of a printing mode, with respect to a printer driver.

In the printer 150, a printer CPU 12 outputs an image signal as output information to a printing unit (printer engine) 19 via a printing unit I/F 17 connected to a system bus 15, on the basis of a control program or the like stored in a program ROM of a ROM 14 or a control program or the like stored in an external memory 21. The program ROM of the ROM 14 stores, e.g., the control program of the CPU 12. A font ROM of the ROM 14 stores, e.g., font data used to generate the output information. A data ROM of the ROM 14 stores, e.g., information used on the user PC if this printer does not have the external memory 21 such as a hard disk.

The CPU 12 can communicate with the user PC 300 via an input unit 16, and can notify the user PC 300 of internal information of the printer and the like. A RAM 13 functions as, e.g., a main memory and work area of the CPU 12. The memory capacity of the RAM 13 can be expanded by an optional RAM connected to an expansion port. The RAM 13 is used as, e.g., an output information rasterizing area, environmental data storage area, and NVRAM. An external memory I/F 18 controls access to the external memory 21 such as a hard disk (HD) or IC card. The external memory 21 is connected as an optional device and stores font data, an emulation program, form data, and the like. An operation panel 20 has switches, LED display devices, and the like for operations.

The number of external memories is not limited to one but at least one. That is, it is also possible to connect an optional font card in addition to the built-in font, and connect a plurality of external memories storing programs for interpreting printer control languages of different language systems. Furthermore, an NVRAM (not shown) may also be used to store printer mode setting information from the operation panel 20.

Figure 3:
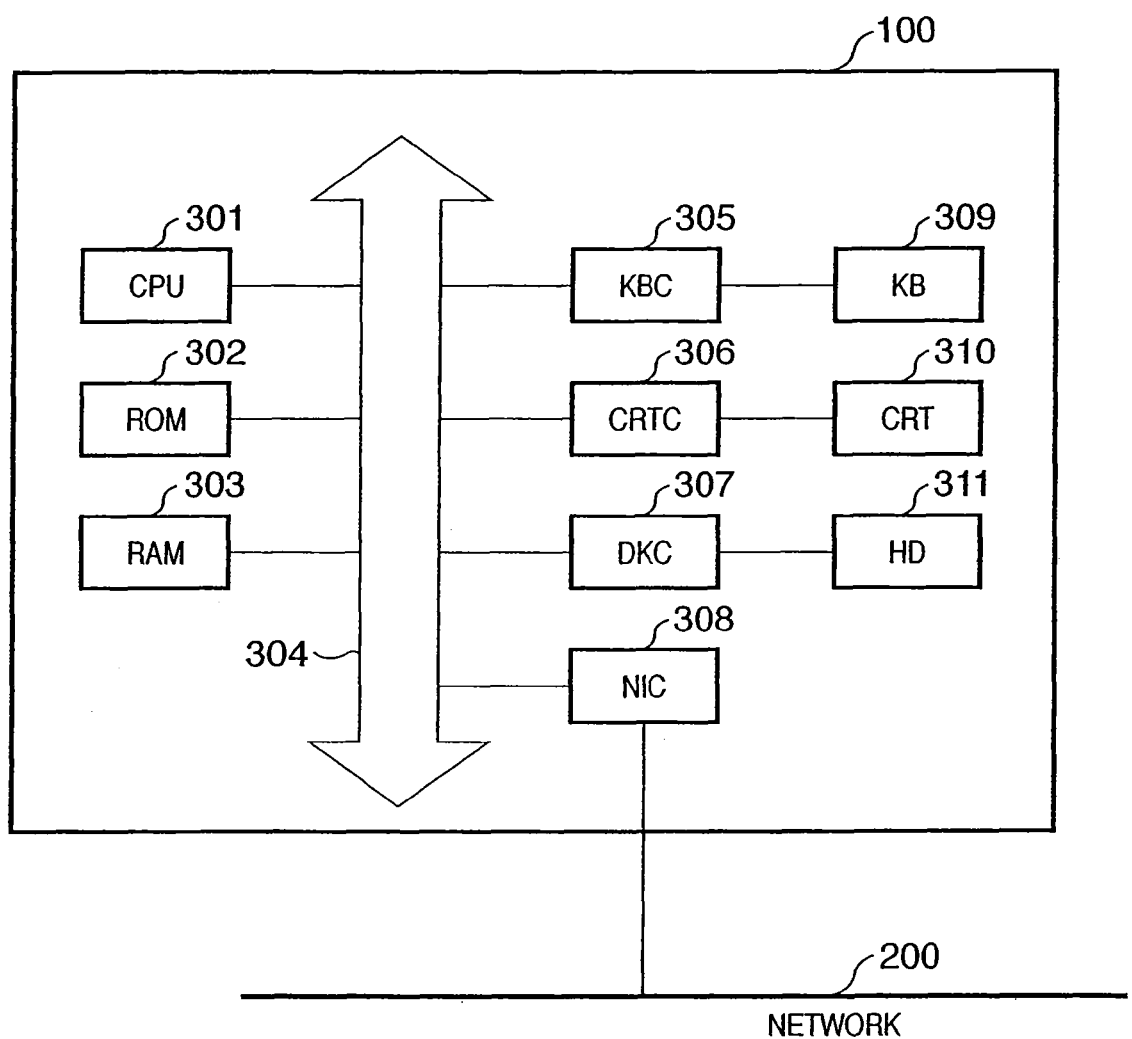
FIG. 3 is a view for explaining the arrangement of a server PC 100 shown in FIG. 1.

FIG. 3 is a view for explaining the arrangement of the server PC 100 shown in FIG. 1. The server PC 100 includes a CPU 301 for executing a network device search program (to be referred to as a "network management program" hereinafter) stored in a ROM 302 or hard disk (HD) 311. The CPU 301 comprehensively controls devices connected to a system bus 304. A RAM 303 functions as, e.g., a main memory and work area of the CPU 301. A keyboard controller (KBC) 305 controls input designations from a keyboard (KB) 309, pointing device (not shown), and the like. A user can set the attribute (e.g., a laser beam printer or bubble jet printer) of a device to be searched for on the network, and the range of search on the network, via an input means such as the keyboard (KB) 309. A CRT controller (CRTC) 306 controls the display contents of a CRT display (CRT) 310. For example, if network devices of interest are found within the set range, a network device list as the search result is displayed on the CRT. A disk controller (DKC) 307 controls access to a hard disk (HD) which stores a boot program, application programs, a network management program, and the like. A network interface card (NIC) 308 bidirectionally exchanges data with an agent or network device via the network 200.

Figure 5:
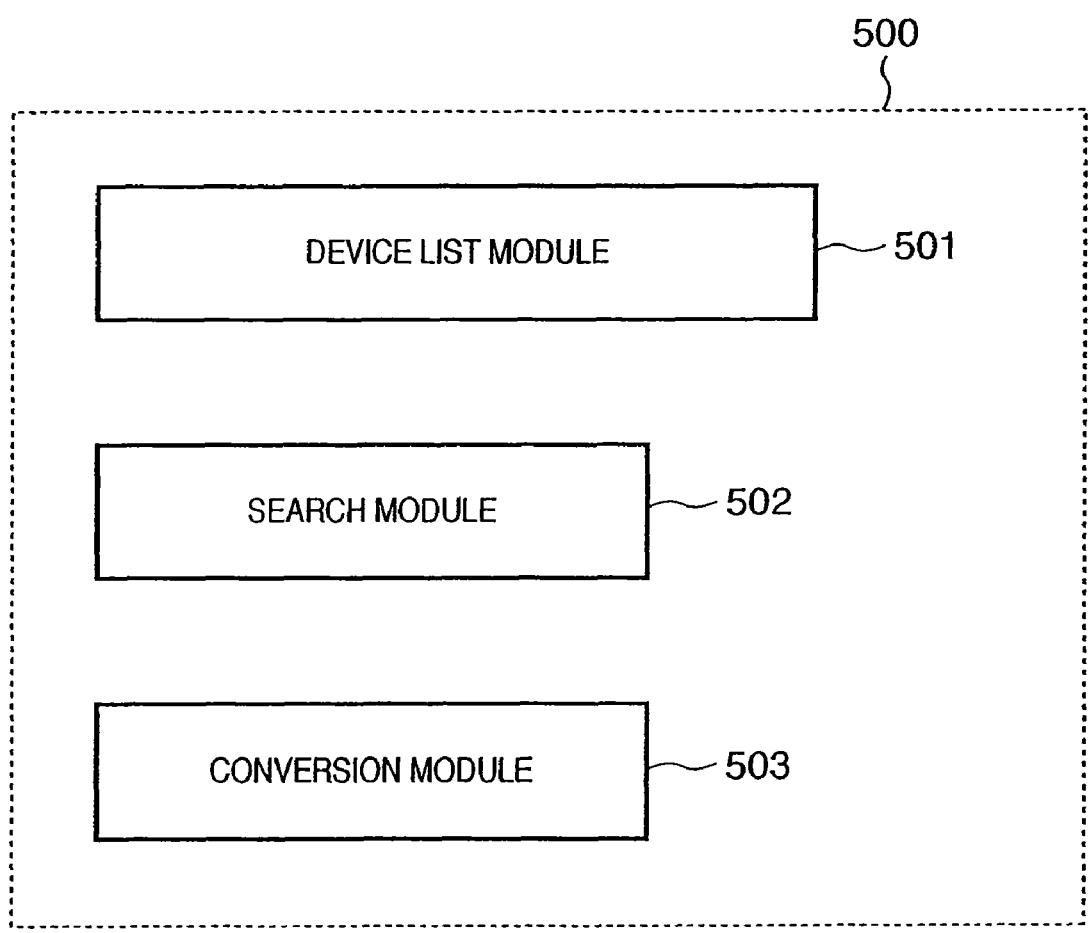
FIG. 5 is a view showing the module configuration of network management software.

FIG. 5 is a view showing the module configuration of the network management software executed by the CPU 301. To execute this software, the CPU 301 uses the RAM 303 as a work area. Referring to FIG. 5, a device list module 501 displays a list of devices connected to the network 200 on the CRT 310. By this displayed list, a user can check the presence/absence of a network device of interest within a designated network range.

A search module 502 searches for a device connected to the network. For example, the search module 502 can search for a printer by using a printer MIB (Management Information Base) which can be managed by an SNMP (Simple Network Management Protocol), a printer corresponding to Jini (Java Information Infrastructure), or a printer corresponding to UPnP (Universal Plug and Play). A list of devices found by the search module 502 is displayed by the device list module 501.

A conversion module 503 converts network address information of a device found by the search module 502 into an address in a form designated by a user, e.g., a domain unit by a DNS (Domain Name System), an OU (Organization Unit) in directory services such as Active Directory, NDS (Novell Directory Service), or an LDAP (Lightweight Directory Access Protocol), or an IP address unit.

Next, the process of downloading a printer driver from the server PC 100 into a predetermined user PC across the network 200, or updating a printer driver will be described below with reference to a flow chart shown in FIG. 4.

<Printer Driver Update Process>

Figure 4:
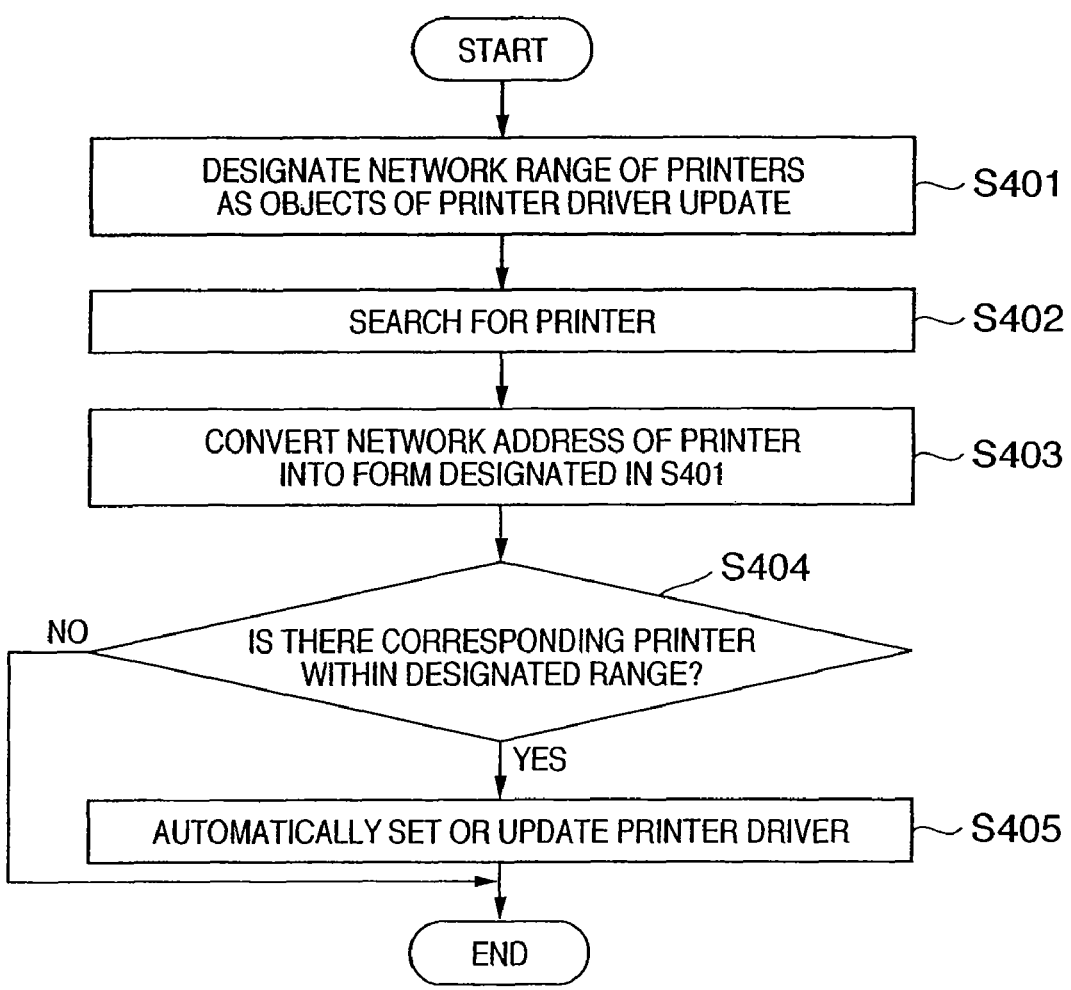
FIG. 4 is a flow chart for explaining the process of installing or updating a printer driver according to the first embodiment of the present invention.

FIG. 4 is a flow chart for explaining the printer driver installation or update process according to the embodiment of the present invention. First, in step S401, the manager of the server PC 100 designates a range on the network as a search range, in order to search for printers as objects of printer driver update. The unit of the "range" designated to search for printers connected to the network largely depends upon the scale of printer management. Examples are a domain unit by a DNS (Domain Name System), an OU (Organization Unit) in directory services such as Active Directory, NDS (Novell Directory Service), or an LDAP (Lightweight Directory Access Protocol), or an IP address unit. The server manager need only designate any of these arbitrary units as the range of printers to be updated; he or she need not know details such as the name and address of each printer on the network.

Figure 6:
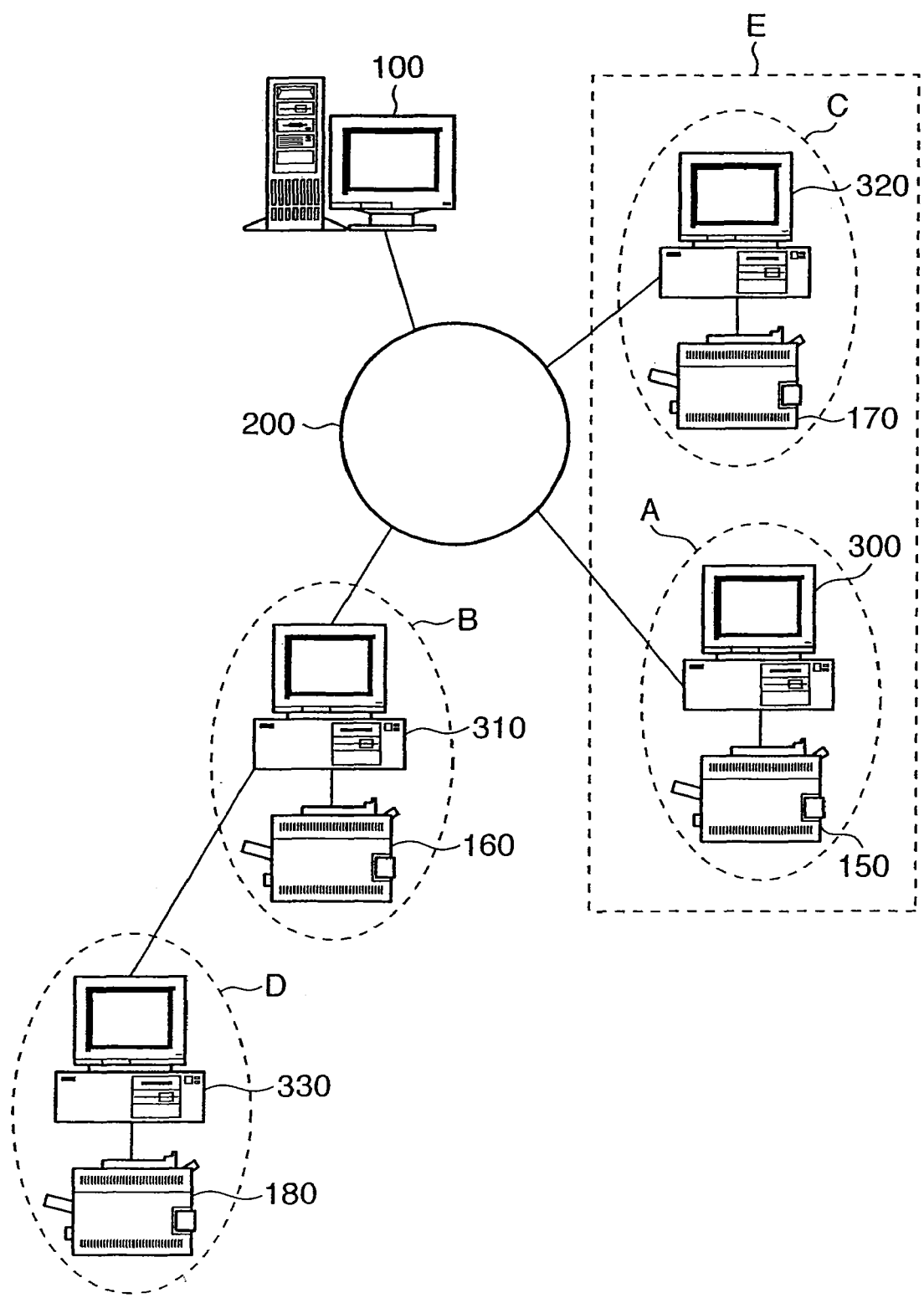
FIG. 6 is a view for conceptually explaining the search range of network devices connected to a network.

FIG. 6 is a view for conceptually explaining the search range of network devices connected to the network. User PCs 300, 310, and 320 are connected to a network 200 and included in regions A, B, and C, respectively, on the network. Printers 150, 160, and 170 are connected to the user PCs 300, 310, and 320, respectively. A user PC 330 included in a region D is connected to the user PC 310, and a printer 180 is connected to the user PC 330. By designating the "range" described above, it is possible to set each of the regions A, B, and C as a printer search range, a region E made up of the regions A and C as a search range, or the regions B and C as a search range.

Printers are then searched for within the range designated in step S402. As a search method, it is possible to search for a printer by using a printer MIB (Management Information Base) which can be managed by an SNMP (Simple Network Management Protocol), a printer corresponding to Jini (Java Information Infrastructure), or a printer corresponding to UPnP (Universal Plug and Play). It is of course also possible to search for printers connected to the network by using some other technique. That is, the gist of the present invention is not limited to the aforementioned search methods, provided that network devices, i.e., user PCs and printers in this embodiment, can be detected in a region designated as a search range on the network.

For example, an SNMP network management technique as one printer search method is as follows. A search module (502 in FIG. 5) containing a network management protocol used to exchange management information executes communication between at least one network management station (NMS: corresponding to the server PC 100 shown in FIG. 1) and a plurality of nodes to be managed (e.g., 300, 310, 150, and 160 shown in FIG. 1) including an agent. A user can acquire information pertaining to the attribute (e.g., a PC, printer, or facsimile apparatus) of a device on the network, and network information (e.g., an IP address, MAC address, or subnet address) of the device, by communicating with agent software on a node to be managed by using the network management software on the NMS (server PC 100).

The "agent" is software running as a background process for each device to be managed connected to the network. This agent holds data concerning its own state in the form of a database (MIB). Each of the user PCs 300 and 310 and printers 150 and 160 has this agent on a network board for connecting to the network, so these user PCs (300 and 310) and printers (150 and 160) can be managed by the network management software. The server PC 100 can request the MIB to transmit information to be collected from an object to be managed, and receive the corresponding data from each device.

Information of a printer or the like need not be acquired by the above-mentioned method. For example, a device attribute information list and network information list registered in the database of the server PC 100 can also be acquired in accordance with the range designated in step S401. Also, the server PC 100 need only acquire these information lists registered in the network disk 220 connected to the network, in accordance with the designated range.

In step S403, on the basis of the printer search process in step S402, a network address is converted into the form by which the range is designated on the network in step S401. For example, if the range on the network is designated for each domain, the server PC 100 communicates with a DNS server (not shown) and acquires the domain name of the corresponding printer or user PC on the basis of the network information (IP address) of the found printer.

If the range on the network is designated for each IP address, the network address of each found device can be acquired from, e.g., the MAC address or subnet address information of the device.

In step S404, whether printers exist in the range designated in step S401 is determined. If corresponding printers exist in the range designated by the server manager (YES in S404), a printer driver is distributed to and installed in each of user PCs (e.g., 300 and 310 in FIG. 1) managing these printers, or an installed printer manager is updated (S405). If there is no corresponding printer within the designated range (NO in S404), the processing is terminated without any update process.

In step S405, as an automatic printer driver installation or update process, a printer driver installation execute file is executed to install or update a printer driver in each of the user PCs controlling the printers within the range designated in step S401. This printer driver installation or update is explained by the technique called push type printer driver installation, so a detailed explanation thereof will be omitted.

Figure 7:
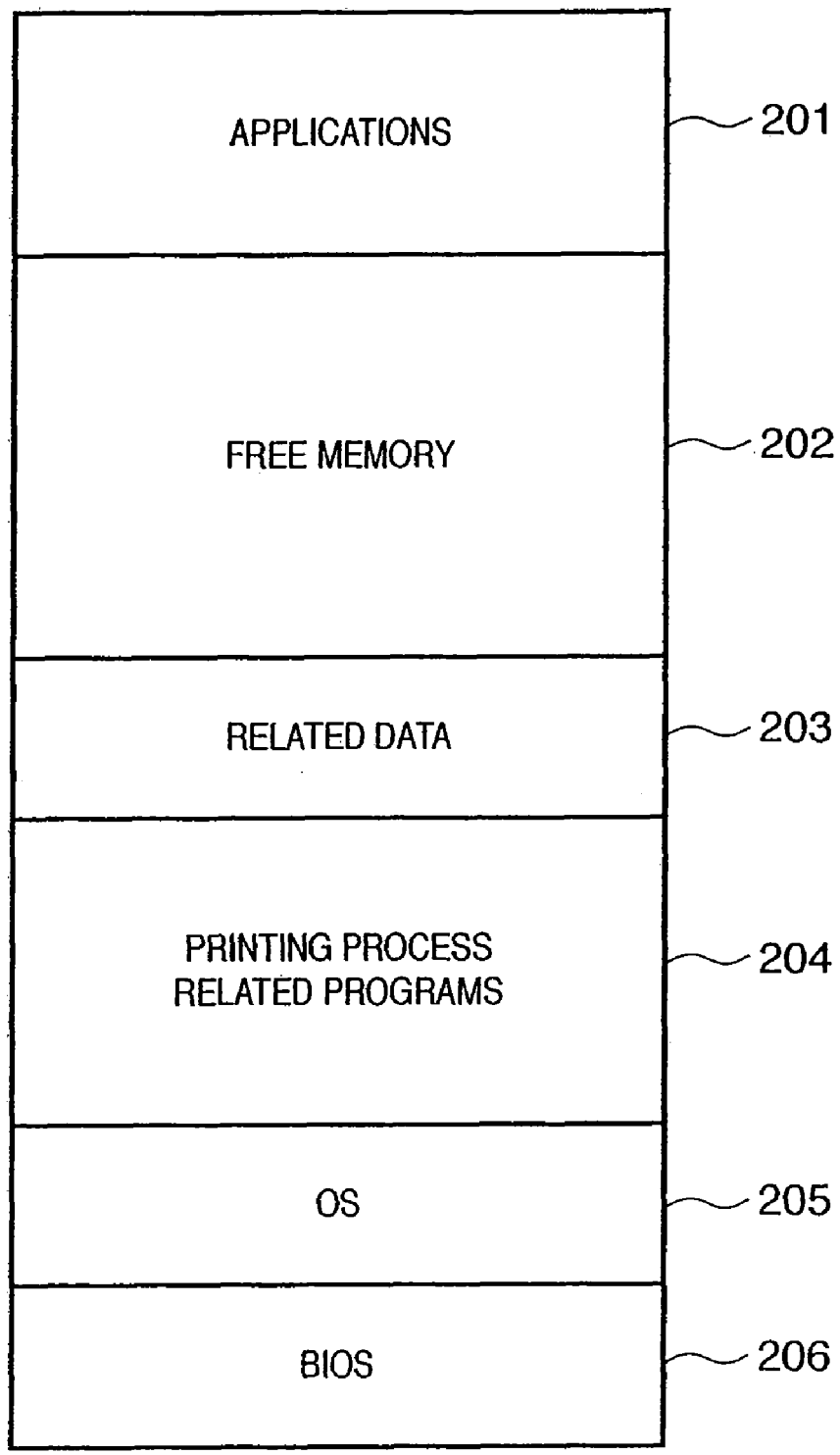
FIG. 7 is a view showing a memory map when a printer driver program is loaded in a RAM 2 on the user PC 300 and made executable in the embodiment.

FIG. 7 is a view showing a memory map when the printer driver program is loaded into the RAM 2 on each of the user PCs 300 and 310 and made executable in this embodiment. This memory map contains various application programs 201 executed on the user PC 300, a free memory area 202, related data 203, printing related programs 204, an OS 205, and a basic I/O system (BIOS) 206 for controlling various devices, e.g., the printer 150, connected to the user PC 300. The printer driver program to be installed is stored in the memory as part of the printing related programs 204.

In this embodiment as described above, in the printer driver installation or update process, each of a large number of existing client computers (user PCs) need not be recognized. That is, only by designating the network range of printers as objects of installation or update, the network addresses of printers and the like within this range can be acquired. On the basis of this address information, printer drivers can be collectively installed or updated in these printers. This processing reduces the load required to individually install or update the printer drivers.

Figure 8:
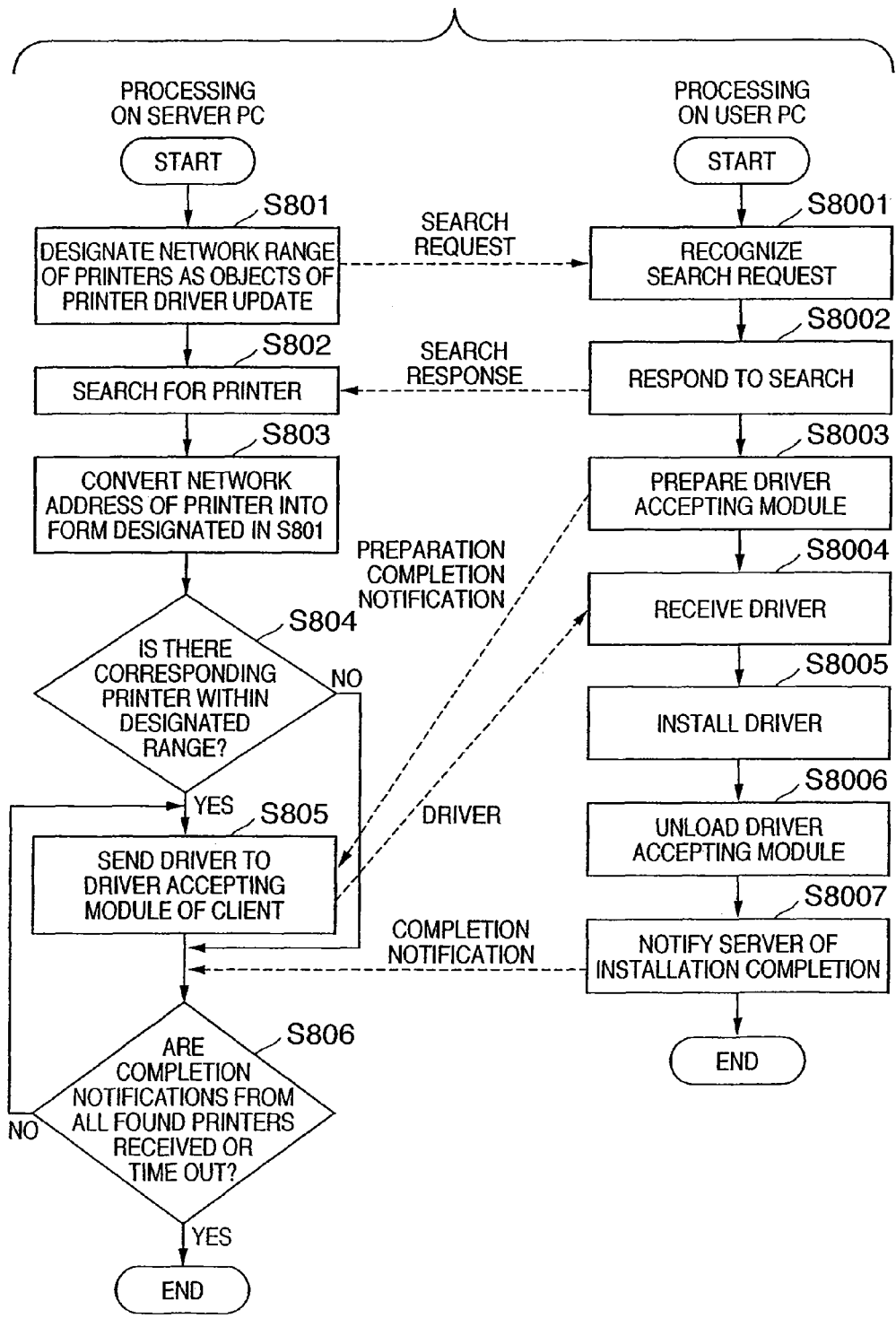
FIG. 8 is a flow chart showing a modification of the installation process shown in FIG. 4.

FIG. 8 is a view showing a modification of the installation process shown in FIG. 4.

In step S801, the network range of printers as objects of printer driver installation or update is designated on the basis of network address information. In response to this search designation in step S801, a search request is transmitted to the user PC 300.

In step S8001, the user PC 300 receives and recognizes the search request transmitted from the server PC 100. In step S8002, the user PC 300 returns a search response to the search request.

Returning to the processing on the server PC 100, in step S802, the server PC 100 sequentially receives and stores search requests from responding printers.

In step S803, on the basis of the results of printer search in step S802, the network address is converted into the form by which the range is designated on the network in step S801. For example, if the range on the network is designated for each domain, the server PC 100 communicates with a DNS server (not shown). On the basis of the network information (IP address) of the found printer, the server PC 100 can acquire the domain name of the corresponding printer or user PC.

If the range on the network is designated in units of IP addresses, the network address of the found device can be acquired from, e.g., the MAC address or subnet address information of the device.

In step S804, whether printers exist in the range designated in step S801 is determined. If corresponding printers exist in the range designated by the server manager (YES in S804), a printer driver is distributed to and installed in a driver accepting module activated in each of user PCs (300 and 310) managing these printers (S805). A printer driver already installed in the user PC 300 is updated (as will be described in detail later). If it is determined in step S804 that there is no corresponding printer within the designated range (NO in S804), the processing is terminated without any installation or update process.

In step S806, the server PC 100 waits for reception of an installation completion notification from the user PC 300. That is, the server PC 100 determines in step S806 whether installation completion notifications are received from all the PCs found in step S802, or whether a predetermined time has elapsed. If installation completion notifications are received from all the user PCs or if the predetermined time has elapsed, the server PC 100 determines that the installation process is normally completed, and terminates the process. If installation completion notifications are not received from all the user PCs and if the predetermined time has not elapsed, the flow returns to step S805 to continue the process.

The processing on the user PC 300 will be explained below. In step S8001, the user PC 300 receives and recognizes the search request transmitted from the server PC 100. In step S8002, the user PC 300 responds to the search request received in step S8001. In step S8003, by interlocking with the response to the search request in step S8002, the user PC 300 loads the driver accepting module as a resident program, and prepares for driver reception. In step S8004, the user PC 300 uses the driver accepting module to receive the driver transmitted in step S805 by the server PC. In step S8005, the user PC 300 installs the driver received in step S8004. When this driver installation process is completed, the flow advances to step S8006 to unload the driver accepting module. In step S8007, if all the received drivers are completely installed or updated, the user PC 300 transmits an installation completion notification to the server PC, and terminates the processing.

It is of course also possible to perform step S8003 in response to the recognition process in step S8001. More preferably, in step S8003, a preparation completion notification indicating that the accepting module for receiving a control program to be activated in the user PC as a driver transfer destination is prepared is transferred to the server PC. At the beginning of step S8005, the preparation completion notification transmitted in step S8003 is recognized. In step S805, the driver distribution process is performed in response to the reception and recognition of the preparation completion notification.

Second Embodiment

The second embodiment to which the present invention is preferably applied will be described below. The configuration of a system according to the second embodiment of the present invention can be represented as a block diagram similar to FIG. 1 explained in the first embodiment.

Figure 9:
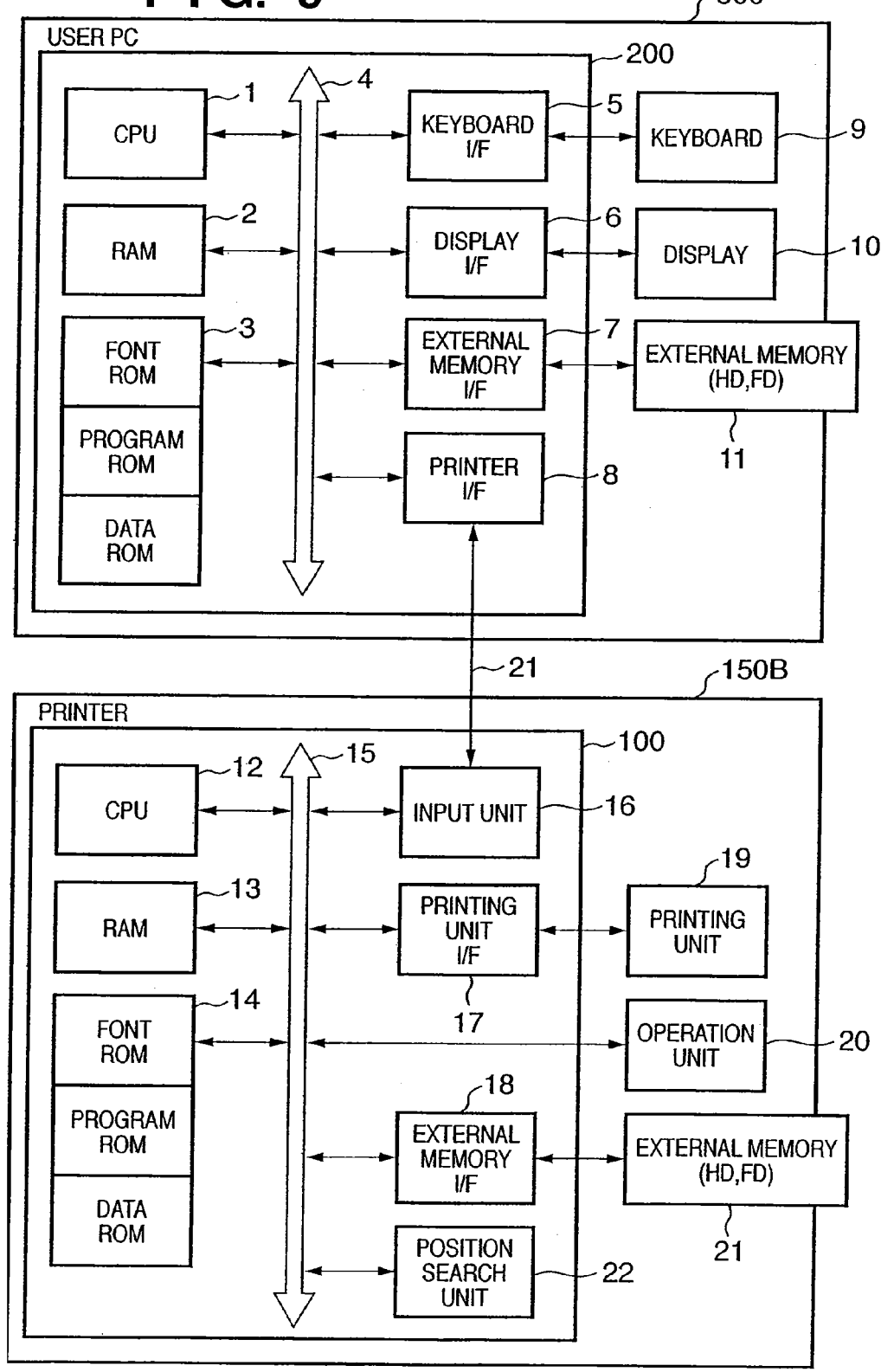
FIG. 9 is a view for explaining an outline of the internal arrangements of a user PC and printer by taking a user PC 300 and printer 150B according to the second embodiment as an example.

FIG. 9 is a view for explaining an outline of the internal arrangements of a user PC and printer by taking the connection of a user PC 300 and printer 150B as an example. In the arrangements shown in FIG. 9, the internal arrangement of the printer 150B is different from that of the printer shown in FIG. 2 in that a position search unit 22 is contained in the printer 150B.

The position search unit 22 detects position information of the printer 150B and stores this position information in a RAM 13 or external memory 21. To set position information, the position search unit 22 using, e.g., a GPS (Global Positioning System) can be installed in the printer to allow the printer itself to detect information of the latitude and longitude. The printer position can be set by comparing the detected information with geographical information (not shown) such as a map indicating buildings, floors, or sections of cities, towns, and villages. The set position information is transmitted from the printer 150B to a server PC 100 (FIG. 1) via the user PC 300 as a response to a request transmitted from the server PC 100.

Note that the same reference numerals as in FIG. 2 denote the same components in the block diagram shown in FIG. 9, and a repetitive explanation thereof will be omitted.

The arrangement of the server PC 100 in the second embodiment is the same as the server PC 100 (FIG. 3) in the first embodiment. That is, the server PC 100 includes a CPU 301 for executing a network management program (the module configuration is indicated by 501 and 502 in FIG. 5) stored in a ROM 302 or hard disk (HD) 311 to search for a network device. A user can set the attribute (e.g., a laser beam printer or bubble jet printer) of a device to be searched for on the network, and the geographical range of the device on the network, via an input means such as a keyboard (KB) 309. This geographical range corresponds to the information detected by the position search unit 22 of the printer 150B.

A CRT controller (CRTC) 306 controls the display contents of a CRT display (CRT) 310. For example, if network devices of interest are found within the set geographical range, a network device list as the search result is displayed on the CRT.

Next, the process according to this embodiment by which a printer driver is downloaded from the server PC 100 into a predetermined user PC 300 across a network 200, or a printer driver is updated will be described below with reference to a flow chart shown in FIG. 10.

<Printer Driver Update Process>

Figure 10:
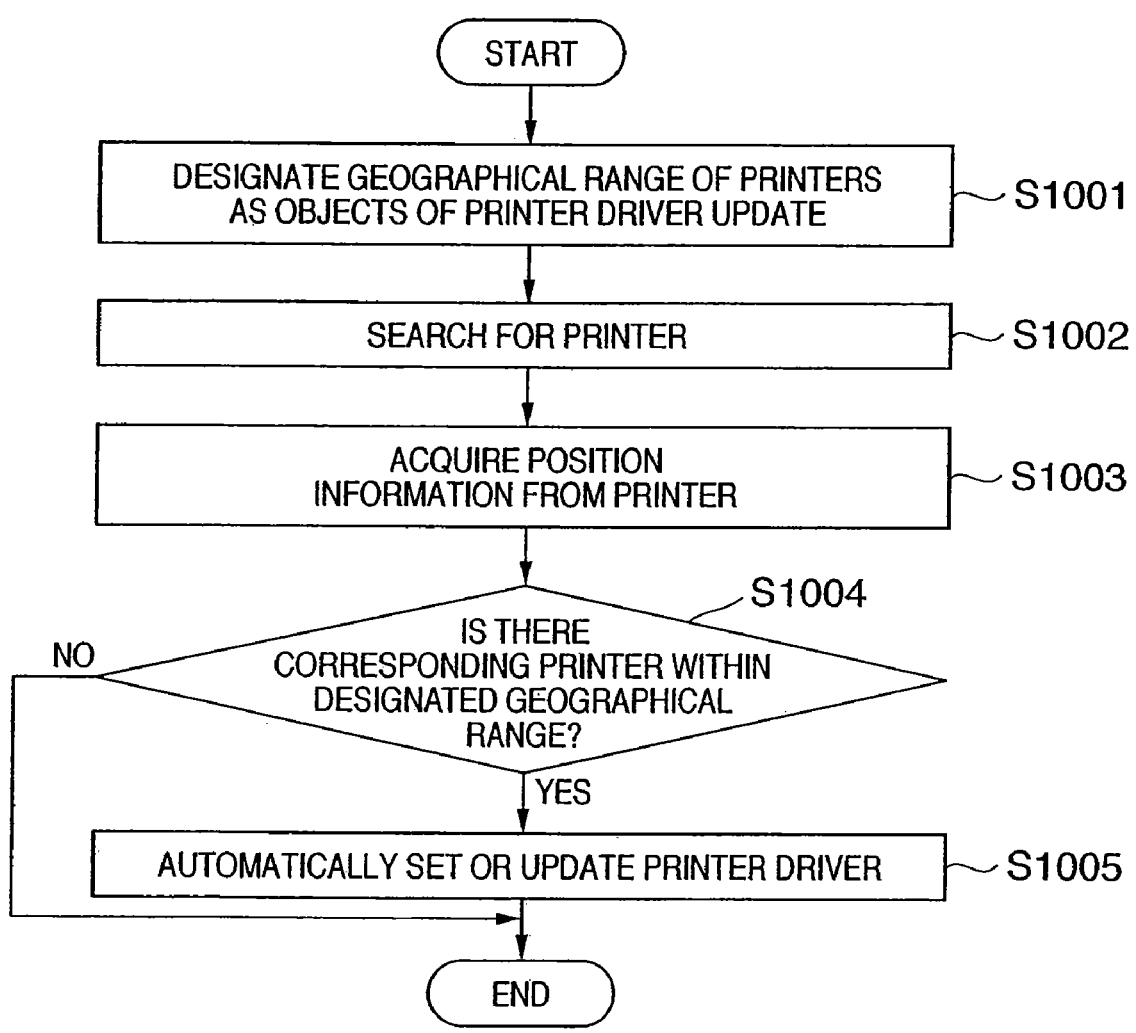
FIG. 10 is a flow chart for explaining the process of installing or updating a printer driver according to the second embodiment of the present invention.

FIG. 10 is a flow chart for explaining the printer driver installation or update process according to the embodiment of the present invention. First, in step S1001, the manager of the server PC 100 designates a geographical printer range as a search range, in order to search for printers as objects of printer driver update. The unit of the "geographical range" designated to search for printers connected to the network largely depends upon the scale of printer management. For example, it is possible to designate, as units, small sections such as rooms, floors, or buildings of a structure in which printers are installed, and large sections such as municipalities, prefectures, or nations. The server manager need only designate any of these arbitrary units as the range of printers to be updated; he or she need not know details such as the name and address of each printer on the network.

In step S1002, printers are searched for within the designated geographical range by executing a search module 502 (FIG. 5). As a search method, it is possible to search for a printer by using a printer MIB (Management Information Base) which can be managed by an SNMP (Simple Network Management Protocol), a printer corresponding to Jini (Java Information Infrastructure), or a printer corresponding to UPnP (Universal Plug and Play). It is of course also possible to search for printers connected to the network by using some other technique. That is, the gist of the present invention is not limited to the aforementioned search methods, provided that network devices, i.e., user PCs and printers in this embodiment, can be detected in a region designated as a search range on the network.

For example, an SNMP network management technique as one printer search method is as follows. A search module (502 in FIG. 5) containing a network management protocol used to exchange management information executes communication between at least one network management station (NMS: corresponding to the server PC 100 shown in FIG. 1) and a plurality of nodes to be managed (e.g., 300, 310, 150, and 160 shown in FIG. 1) including an agent. A user can acquire information pertaining to the attribute (e.g., a PC, printer, or facsimile apparatus) of a device on the network, and information for specifying the geographical position of the device, by communicating with agent software on a node to be managed by using the network management software on the NMS (server PC 100). The agent holds data concerning its own state in the form of a database (MIB). Each of the user PC 300 and printer 150B has this agent on a network board for connecting to the network, so the user PC 300 and printer 150B can be managed by the network management software. The server PC 100 can request the MIB to transmit information to be collected from an object to be managed, and receive the corresponding data from each device.

Information of a printer or the like need not be acquired by the above-mentioned method. For example, a device attribute information list and device geographical position information list registered in the database of the server PC 100 can also be acquired in accordance with the range designated in step S1001. Also, the server PC 100 need only acquire these information lists registered in a network disk 220 (FIG. 1) connected to the network, in accordance with the designated range.

In step S1003, on the basis of the printer search process in step S1002, the server PC 100 acquires position information of each printer. As a method of acquiring position information, for example, position information can be collected from each network device by the MIB which can be managed by the SNMP. A communication protocol between the server PC 100 and a network device is not limited to the SNMP. For example, position information can also be acquired by an IPP (Internet Printing Protocol) or a SOAP (Simple Object Access Protocol).

As described above with reference to FIG. 9, the printer 150B has the position search unit 22 as a means for searching for and setting position information. The set position information can be stored in the external memory 21.

To search for and set position information, a unit using, e.g., a GPS (Global Positioning System) can be installed as the position search unit 22 in the printer to allow the printer itself to detect information of the latitude and longitude. The printer position can be set by comparing the detected information with geographical information (not shown) such as a map indicating buildings, floors, or sections of municipalities. The set position information is transmitted from each printer to the server PC 100 via the user PC 300 as a response to a request transmitted from the server PC 100.

A packet exchanged between the server PC 100 and the network device (e.g., the user PC 300 or printer 150B), and suited to the protocol, such as the SNMP, IPP, or SOAP, contains position information of the printer, and user PC network address information for controlling the printer. Therefore, the server PC 100 can specify printer position information by a response from each printer. In addition, the network address of each user PC (300 or 310) managing each printer can be specified by a response from the user PC.

In step S1004, whether printers exist in the geographical range designated in step S1001 is determined on the basis of the position information acquired in step S1003. If corresponding printers exist in the range designated by the server manager (YES in S1004), a printer driver is distributed to and installed in each of user PCs (e.g., 300 and 310 in FIG. 1) managing these printers, or an installed printer manager is updated (S1005). If there is no corresponding printer within the designated range (NO in S1004), the processing is terminated without any update process.

Figure 11A:
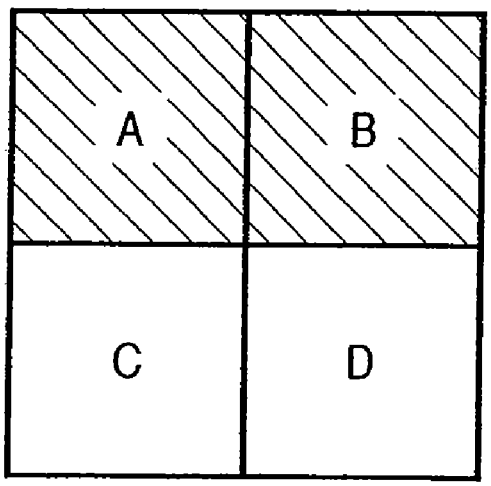
FIGS. 11A and 11B are views for conceptually explaining a target region set from a designated geographical range and a printer search result to automatically update printer drivers.
Figure 11B:
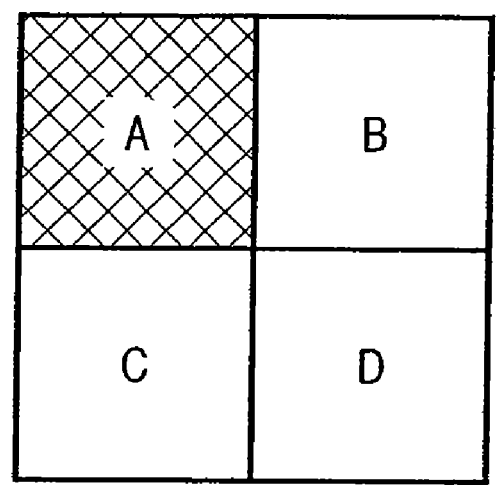

FIGS. 11A, 11B, 12A, and 12B are views for conceptually explaining a target region which is set from the designated geographical range and the printer search result, and in which a printer driver is automatically installed or updated. In FIGS. 11A to 12B, "A" to "D" indicate regions corresponding to the geographical range. FIG. 11A shows an example of the geographic range designated in step S1001 of FIG. 10. Referring to FIG. 11A, a hatched portion (the regions A and B) is the designated geographical range. FIG. 11B shows the position of a printer found in steps S1002 and S1003 of FIG. 10. Referring to FIG. 11B, a printer exists only in the region A.

A "region A" in which the regions A and B designated as the geographical range and the region A in which the found printer exists overlap each other is a target region in which a printer driver is to be automatically installed or updated. In this case, in step S1005 of FIG. 10, a printer driver installation execute file is executed as the automatic printer driver installation or update process. Consequently, a printer driver is installed or updated in a user PC which controls the printer within the range designated in step S1001. This printer driver installation or update is explained by the conventional technique called push type printer driver installation, so a detailed explanation thereof will be omitted.

FIG. 12A shows the geographical range designated in step S1001 of FIG. 10. Referring to FIG. 12A, a hatched portion (the region A) is the designated geographical range. FIG. 12B shows the positions of printers found in steps S1002 and S1003 of FIG. 10. Referring to FIG. 12B, printers exist only in the regions B, C, and D. Since the region A designated as the geographical range does not overlap the regions B, C, and D in which the found printers exist, no automatic printer driver installation or update is executed in accordance with the step (NO in S1004) in FIG. 10, and the processing is terminated.

In this embodiment as described above, when a printer driver for controlling a printer is to be installed or updated, each of a large number of existing client computers (user PCs) need not be recognized. That is, only by designating the geographical range of printers as objects of installation or update, it is possible to search for printers within this range, and collectively install or update plural printer drivers in user PCs which manage these printers in response to a single install instruction from the user. This processing reduces the load required to individually install or update the printer drivers.

Figure 13:
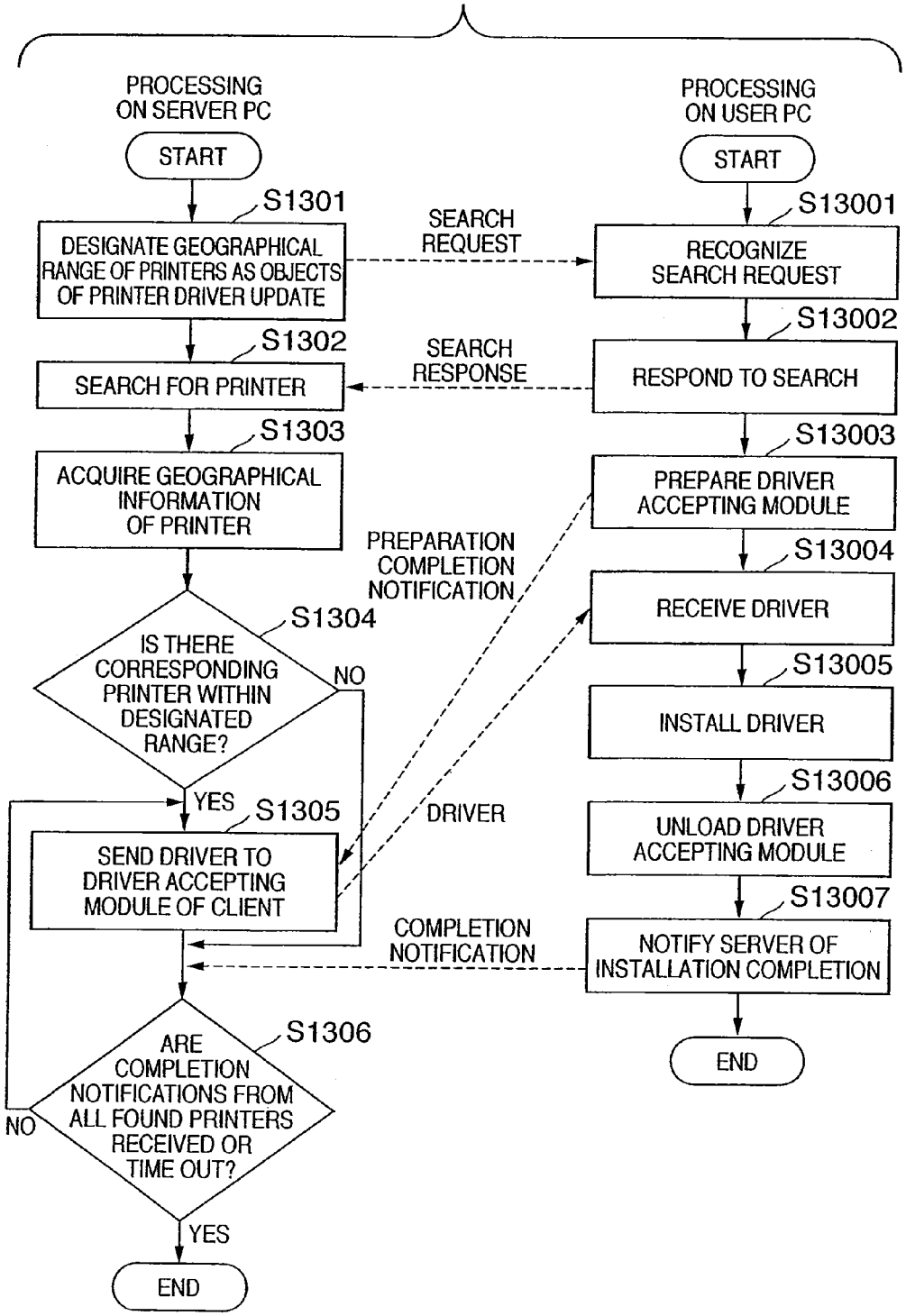
FIG. 13 is a view showing a modification of the installation process shown in FIG. 10.

FIG. 13 is a view showing a modification of the installation process shown in FIG. 10.

Portions largely different from the processing shown in FIG. 10 will be explained below with reference to FIG. 13. In step S1301, the geographical range of printers as objects of printer driver installation or update is designated. In response to this search designation in step S1301, a search request is transmitted to the user PC 300.

In step S13001, the user PC 300 receives and recognizes the search request transmitted from the server PC 100. In step S13002, the user PC 300 returns a search response to the search request.

Returning to the processing on the server PC 100, in step S1302, the server PC 100 sequentially receives and stores search requests from responding printers.

In step S1303, on the basis of the printer search process in step S1302, the server PC 100 acquires position information of each printer. As a method of acquiring position information, for example, position information can be collected from each network device by the MIB which can be managed by the SNMP. A communication protocol between the server PC 100 and a network device is not limited to the SNMP. For example, position information can also be acquired by an IPP (Internet Printing Protocol) or a SOAP (Simple Object Access Protocol).

In step S1304, whether printers exist in the range designated in step S1301 is determined. If corresponding printers exist in the range designated by the server manager (YES in S1304), a printer driver is distributed to and installed in a driver accepting module activated in each of user PCs (300 and 310) managing these printers (S1305). A printer driver already installed in the user PC 300 is updated (this process will be described in detail later). If it is determined in step S1304 that there is no corresponding printer within the designated range (NO in S1304), the processing is terminated without any installation or update process.

In step S1306, the server PC 100 waits for reception of an installation completion notification from the user PC 300. That is, the server PC 100 determines in step S1306 whether installation completion notifications are received from all the PCs found in step S1302, or whether a predetermined time has elapsed. If installation completion notifications are received from all the user PCs or if the predetermined time has elapsed, the server PC 100 determines that the installation process is normally completed, and terminates the process. If installation completion notifications are not received from all the user PCs and if the predetermined time has not elapsed, the flow returns to step S1305 to continue the process.

The processing on the user PC 300 will be explained below. In step S13001, the user PC 300 receives and recognizes the search request transmitted from the server PC 100. In step S13002, the user PC 300 responds to the search request received in step S13001. In step S13003, by synchronizing with the response to the search request in step S13002, the user PC 300 loads the driver accepting module as a resident program, and prepares for driver reception. In step S13004, the user PC 300 uses the driver accepting module to receive the driver transmitted in step S1305 by the server PC. In step S13005, the user PC 300 installs the driver received in step S13004. When this driver installation process is completed, the flow advances to step S13006 to unload the driver accepting module. In step S13007, if all the received drivers are completely installed or updated, the user PC 300 transmits an installation completion notification to the server PC, and terminates the processing.

It is of course also possible to perform step S13003 in response to the recognition process in step S13001. More preferably, in step S13003, a preparation completion notification indicating that the accepting module for receiving a control program to be activated in the user PC as a driver transfer destination is prepared is transferred to the server PC. At the beginning of step S13005, the preparation completion notification transmitted in step S13003 is recognized. In step S1305, the driver distribution process is performed in response to the reception and recognition of the preparation completion notification.

Third Embodiment

If a plurality of processes can be automatically executed in accordance with a script by describing the process of searching for a printer and installing or updating a printer driver in the found printer, explained in FIG. 4 of the first embodiment and FIG. 10 of the second embodiment, by using "perl", "java script", or "WSH (Windows Script Host)" as an interpreter type simplified program language, these processes can be flexibly performed in accordance with the configuration of a network system, and this is very desirable for a system manager. The system manager need only describe, by the above-mentioned simplified program language, designations ("script information") for searching for a network device connected to a client computer (client PC), and installing or updating a control program for controlling the network device. In this manner, the system manager can install, in each client PC, a control program necessary for a network device connected to the client PC.

FIG. 14 is a view showing an example in which script information for automatically executing the process of searching for a printer and installing or updating a printer driver in the found printer, explained with reference to FIG. 4 in the first embodiment, is described in "Jscript" of Microsoft. The contents of this script information shown in FIG. 14 are to designate the range of an IP address, and push-install, in a client PC, a printer driver for a corresponding printer within the range. The contents of the script information are not limited to designation of the search range by an IP address, but can also be so changed as to designate information pertaining to the geographical range explained in the second embodiment. In this case, a certain building name and floor name are designated, and a search process which designates printers in this designated place (geographical range) is executed. It is also possible to preset a building name and floor name in a printer, and allow the printer itself to return a response if there is a packet which inquires a certain building name and floor name.

The example of the script information shown in FIG. 14 is described in JScript of Microsoft. However, the effect of this embodiment is not limited to this simplified program language, and can also be achieved by the various simplified program languages described above.

The contents of the script information shown in FIG. 14 will be described in detail below.

In step S1401, a "CNClientPC object" is generated. This CNClientPC object is an object for enumerating client PCs (e.g., 300 and 301 in FIG. 1) managed by the network manager. To use this object, a COM module must be prepared in a server PC (e.g., 100 in FIG. 1). Details of COM components are irrelevant to the present invention, so an explanation thereof will be omitted.

In step S1402, a TargetClients method of the CNClientPC object is called to search for a client PC for which a printer driver is to be installed or updated. The range of client PCs is narrowed down by the name "GROUP-1". If, for example, there are some client PC groups, a plurality of group names can be described as script information.

In step S1403, an "Enumerator object" is used to make preparations for enumerating found client PCs.

In step S1404, a "CNNetworkPrinter object" is generated. This CNNetworkPrinter object is an object for enumerating printers managed by the network manager. Similar to the CNClientPC object described above, a COM module must be prepared in a server PC in order to use this CNNetworkPrinter object. Details of COM components are irrelevant to the present invention, so an explanation thereof will be omitted.

In step S1405, a TargetPrinters method of the CNNetworkPrinter object is called to search for printers. The search range is narrowed down to printers having IP addresses from 192.168.0.1 to 192.168.0.15. By setting various IP address ranges, printers into which printer drivers are to be installed can be designated.

Instead of IP addresses, as the geographical range explained in the second embodiment, a geographical range such as "Building A 6F" can also be designated as a combination of the name of a building and floor information of the building.

In step S1406, an "Enumerator object" is used to make preparations for enumerating found printers.

In step S1407, client PCs are enumerated and displayed. This step is paired with step S1412, and the process between these steps is repeated until the enumeration is completed.

In step S1408, found printers are enumerated and displayed. This step is paired with step S1411, and the process between these steps is repeated until the enumeration is completed. In this embodiment, responses from printers corresponding to the designated IP addresses are recognized, and the process of enumerating and displaying the corresponding printers is executed on the basis of the responses.

If a geographical range in which printers are installed is designated instead of IP addresses, responses from printers in which corresponding predetermined geographical information is preset are recognized, and the process of enumerating and displaying the corresponding printers is executed on the basis of the responses. It is also possible to allow a printer which recognizes its own position by a GPS (Global Positioning System) to recognize a geographical range to which the printer belongs, and respond if the recognized geographical range matches an inquiry search packet requesting a response.

In step S1409, printer drivers for the thus enumerated printers are installed in the found, recognized, and enumerated client PCs. The installation process is similar to, e.g., step S405 in FIG. 4 or step S1005 in FIG. 10.

In step S1410, a print queue for the enumerated printers is constructed for the enumerated client PCs.

FIG. 15 is a view showing an example of a script for automatically executing the process of searching for printers, and installing or updating printer drivers. Unlike the contents shown in FIG. 14, FIG. 15 shows contents by which an IP address range is designated, and printer drivers of printers falling outside this range are push-installed in client PCs. This script information shown in FIG. 15 is the same as that shown in FIG. 14 except that step S1505 differs from step S1405. Therefore, only step S1505 will be explained below.

In step S1505 of FIG. 15, printers are searched for by calling a TargetPrinters method of a CNNetworkPrinter object. This is the same as in step S1405 of FIG. 14. However, in this designation, objects of search are printers having IP addresses falling outside the range of 192.168.0.1 to 192.168.0.15. A search range on the network can be designated by setting various IP address ranges. As indicated by the example of the script information shown in FIG. 14, a search range can also be directly designated (objects within a search range can also be designated) in accordance with the size of the search range. Alternatively, as indicated by the example of the script information shown in FIG. 15, a search range can be exclusively designated (objects outside a search range can be designated).

In this embodiment as explained above, a manager can collectively execute installation from automatic printer search to automatic installation, without walking around clients, only by describing simple script information for push installation.

Other Embodiments

Although a printer driver is an object in the above embodiments, the present invention can also be practiced for various device drivers, e.g., drivers of a display, scanner, digital camera, facsimile apparatus, mouse, loudspeaker, sound source device, and telephone.

Further, the object of the present invention can also be achieved by supplying a storage medium storing the program code of software for implementing the functions of the above embodiments to a system or apparatus, and reading out and executing the program code stored in the storage medium by a computer (or a CPU or MPU) of the system or apparatus. In this case, the program code read out from the storage medium implements the functions of the present invention, and the storage medium storing this program code constitutes the invention.

As this storage medium for supplying the program code, it is possible to use, e.g., a floppy (registered trademark) disk, hard disk, optical disk, magnetooptical disk, CD-ROM, CD-R, magnetic tape, nonvolatile memory card, and ROM.

Also, besides the functions of the above embodiments are implemented by executing the readout program code by the computer, the present invention includes a case where an OS (Operating System) or the like running on the computer performs part or the whole of actual processing in accordance with designations by the program code and thereby implements the functions of the embodiments.

Furthermore, the present invention also includes a case where the program code read out from the storage medium is written in a memory of a function expansion board inserted into the computer or of a function expansion unit connected to the computer, and, in accordance with instructions by the program code, a CPU or the like of the function expansion board or function expansion unit performs part or the whole of actual processing and thereby implements the functions of the above embodiments.

The present invention can be used to collectively push-install or update, in client computers on a network, the latest versions of control programs for controlling network devices connected to the network.

As many apparently widely different embodiments of the present invention can be made without departing from the spirit and scope thereof, it is to be understood that the invention is not limited to the specific embodiments thereof except as defined in the appended claims.

The invention claimed is:

1. An information processing method executed in a server apparatus which distributes across a network a printer driver program for controlling a printing device to a client apparatus for managing the printing device, said method comprising:
    a designation step of designating range information for searching for a printing device connected to the network;
    a search step of searching for the printing device which is controlled by installing the printer driver program to the client apparatus, wherein the search step sends a search request to the printing device and receives from the printing device a response including an IP address;
    a determination step of determining, in accordance with the response including the IP address, whether or not the printing device searched in the search step has the IP address within the range information designated in the designation step; and
    a distribution step of distributing a printer driver program, from the server apparatus to the client apparatus, for managing the printing device determined in the determination step as the printing device having the IP address within the range information designated in the designation step.

2. The method according to claim 1, wherein the distribution step performs the distribution process by using the IP address.

3. The method according to claim 1, further comprising a recognition step of recognizing a preparation completion notification indicating that an accepting module which is activated in the client apparatus as a transfer destination of the printer driver program and receives the printer driver program is prepared,
    wherein the distribution step distributes the printer driver program in response to recognition of the preparation completion notification in the recognition step.

4. The method according to claim 2, further comprising acquiring IP address information corresponding to the range information for search.

5. The method according to claim 1, wherein the range designated to search for the printing device is designated for each domain, each OU (Organization Unit) in a directory service, or each IP address.

6. A server apparatus for distributing across a network a printer driver program for controlling a printing device to a client apparatus for managing the printing device, said server apparatus comprising:
    designating means for designating range information for searching for a printing device connected to the network;
    searching means for searching for the printing device which is controlled by installing the printer driver program to the client apparatus, wherein the searching means sends a search request to the printing device and receives from the printing device a response including an IP address;
    determination means for determining, in accordance with the response including the IP address, whether or not the printing device searched by said searching means has the IP address within the range information designated by said designating means; and
    distributing means for distributing a printer driver program, from said server apparatus to the client apparatus, for managing the printing device determined by said determination means as the printing device having the IP address within the range information designated by said designating means.

7. A program which is stored in a computer-readable storage medium and causes a server apparatus to execute an information processing method for distributing across a network a printer driver program for controlling a printing device to a client apparatus for managing the printing device, said method comprising:

a designation step of designating range information for searching for a printing device connected to the network;

a search step of searching for the printing device which is controlled by installing the printer driver program to the client apparatus, wherein the search step sends a search request to the printing device and receives from the printing device a response including an IP address;

a determination step of determining, in accordance with the response including the IP address, whether or not the printing device searched in the search step has the IP address within the range information designated in the designation step; and a distribution module for distributing a printer driver program, from the server apparatus to the client apparatus, for managing the printing device determined in the determination step as the printing device having the IP address within the range information designated in the designation step.

* * * * *